April 16, 1968  P. G. HOLLINS  3,378,114
DISCS FOR DISC BRAKES
Original Filed Aug. 17, 1964  3 Sheets-Sheet 2
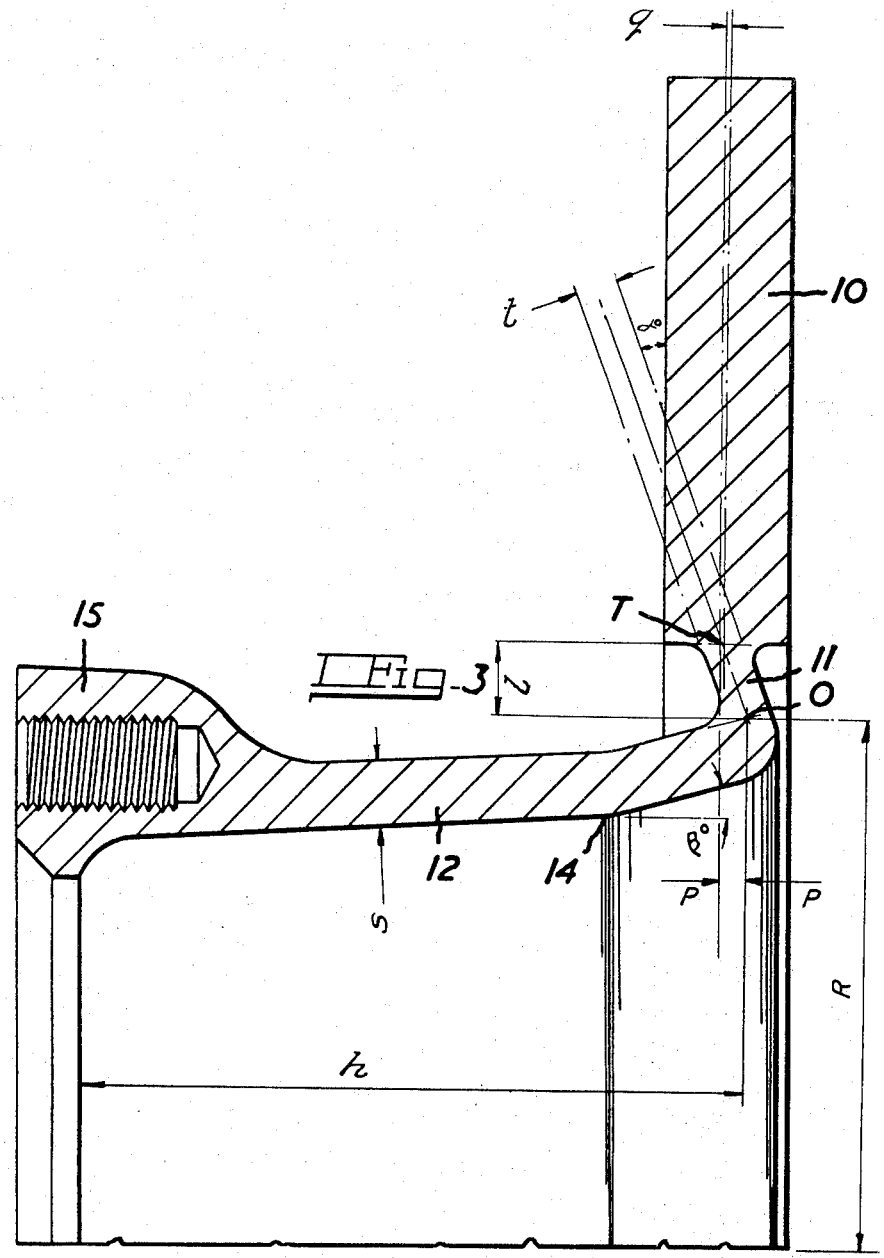

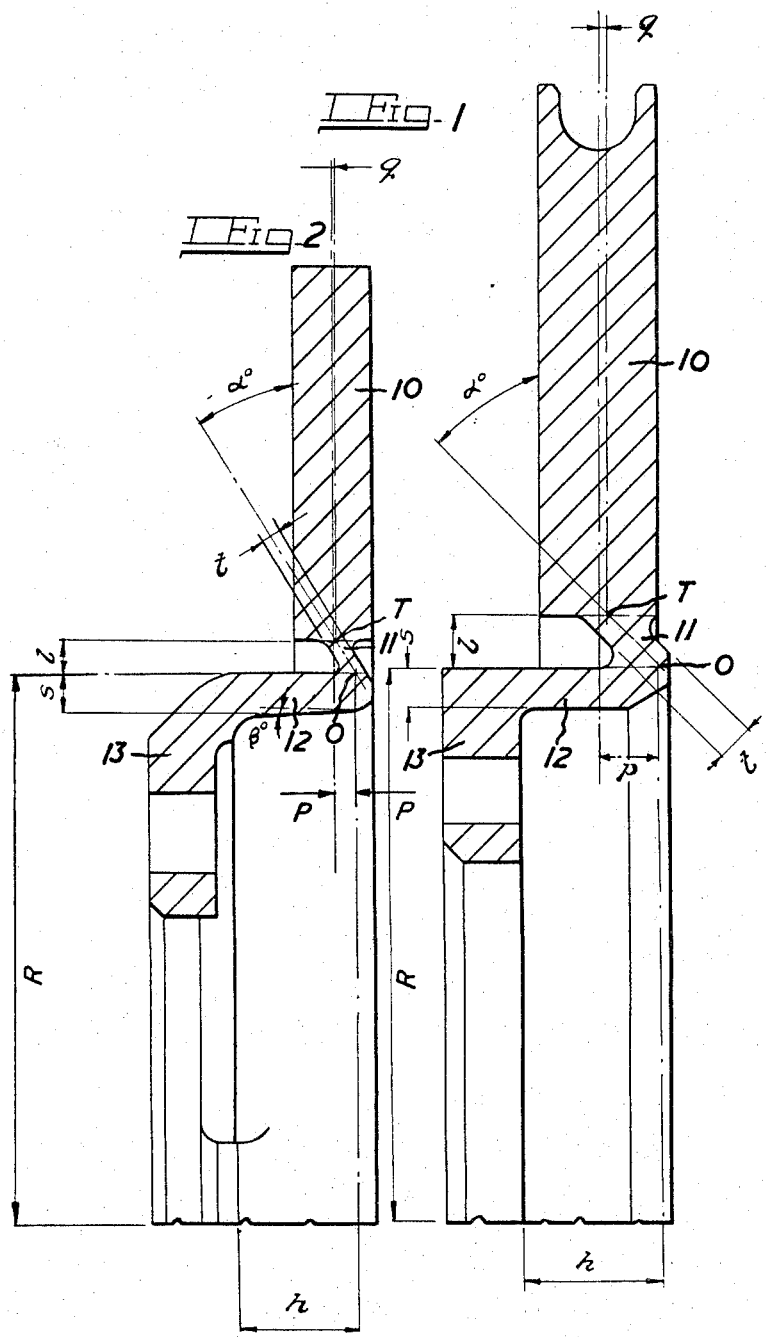

April 16, 1968  P. G. HOLLINS  3,378,114
DISCS FOR DISC BRAKES
Original Filed Aug. 17, 1964  3 Sheets-Sheet 3
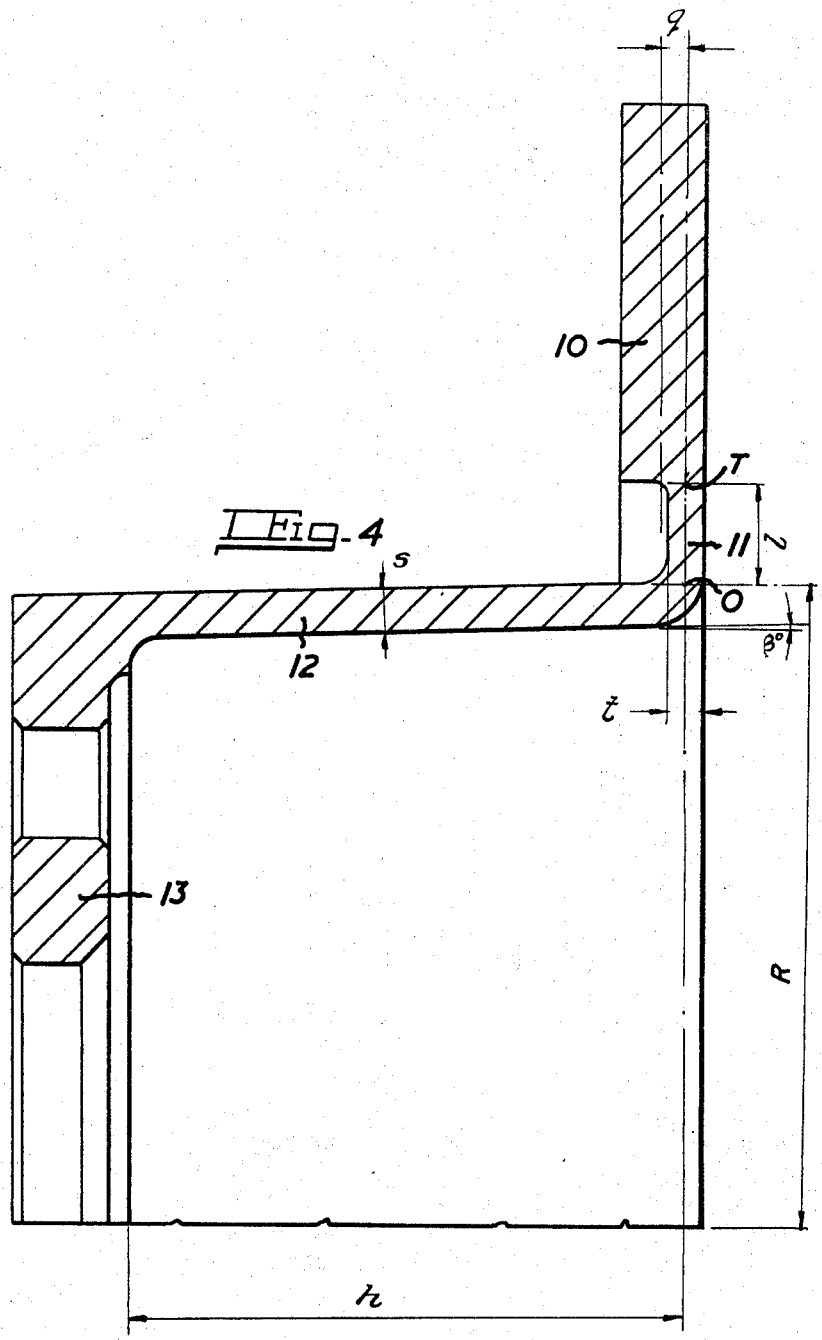
Peter George Hollins
By Scrivener Parker Scrivener + Clarke United States Patent Office 3,378,114
Patented Apr. 16, 1968

3,378,114
DISCS FOR DISC BRAKES
Peter George Hollins, Coventry, England, assignor to Girling Limited, Tyseley, Birmingham, England, a British company
Continuation of application Ser. No. 390,004, Aug. 17, 1964. This application Aug. 17, 1966, Ser. No. 580,133
6 Claims. (Cl. 188—218)

ABSTRACT OF THE DISCLOSURE

Minimizing of coning effects of a brake disc due to heat is achieved by a re-entrant web interconnecting an axially extending part or bell and the braking flange, the re-entrant web being inclined to a plane at right angles to the rotational axis of the flange in a direction towards the attaching end of the bell with the center line of the web intersecting the bell at a point offset from the center line of the flange in a direction away from the first end of the bell member, cone distortion and axial movement of the braking flange due to heat being thereby minimized.

---

This is a continuation of application Ser. No. 390,004, filed Aug. 17, 1964, now abandoned.

This invention relates to discs for disc brakes.

A common form of disc comprises a generally cylindrical part extending in the direction of the rotational axis of the disc and having at one end a radially extending flange providing braking surfaces and at the other end a radial flange for attachment to a rotatable part such as a vehicle wheel.

When the disc becomes heated on application of the brake, the braking flange expands radially outwardly and the axially extending part expands most at the braking flange end. This causes the braking flange to distort to the form of a shallow cone and also to move axially.

In a disc brake in which friction pads are applied to opposite faces of the braking flange by pistons working in hydraulic cylinders the "coning" of the flange causes the flange-engaging surfaces of the friction pads to wear to an inclined form. Also, the axial movement forces one piston back into its cylinder and requires the other piston to advance.

When the disc cools down after braking, the braking flange returns to its normal position with the result that the clearance between the centre of each pad and the flange is increased owing to the inclined direction of wear of the pads and, added to this, there is further excess clearance between one pad and the flange owing to the return axial movement of the flange, the other pad having been pushed back during this return axial movement. Subsequent operation of the brake requires an excessive pedal travel and may lead to failure of the brake because of insufficient feed of fluid to the brake cylinders.

In a brake in which there is a movable housing having one hydraulic cylinder for one pad, the other pad being operated indirectly, the "coning" of the braking flange can cause excessive take-up of the limited clearance normally available between the flange and the pads with the result that the brake jams.

The generally axially extending bell member may be cylindrical or approximately cylindrical or may increase in diameter in a direction from said other end towards the end carrying the braking flange. It may have a cylindrical outer surface and an internal surface which increases in diameter in that same direction.

Four forms of disc in accordance with our invention are illustrated by way of example in the accompanying drawings, FIGURES 1–4, each of which is a half diametral section, that is a section showing half of a disc taken in a plane containing the rotational axis of the disc.

In these figures the following points and dimensions are shown:

Point O is at the intersection of the centre line of the web with a continuation of the outer surface of the axially extending part.

Point T is at the intersection of the centre line of the web with the continuation of the inner peripheral surface of the flange.

R is the radius of the axially extending part measured to the point O.

S is the thickness of the axially extending part.

$\beta$ is the angle of inclination of the inner surface of the axially extending part to the rotational axis of the disc, at the braking flange end.

$h$ is the length of the axially extending part measured from the inside of the fixing flange to the point O.

$l$ is the length of the web measured radially from the point O to the point T.

$t$ is the thickness of the web.

$p$ is the extent of the offset of the point O from the centre line of the braking flange in a direction away from the fixing flange end of the axially extending part.

$q$ is the distance between the centre line of the braking flange and the point T.

$\alpha$ is angle of inclination of the web to a plane at right angles to the rotational axis of the disc.

In the examples shown in FIGURES 1, 2 and 3 the web has part-conical faces of the same angle of inclination, and plane faces at right angles to the rotational axis of the disc in the example shown in FIGURE 4.

The values of the various dimensions in each of the four examples are as follows:

FIGURE 1

$R = 2.629''$      $t = .180''$
$S = .182''$      $p = 0.293''$
$\beta = 0°$      $q = .035''$
$h = .665''$      $\alpha = 45°$
$l = .258''$

FIGURE 2

$R = 2.605''$      $t = .095''$
$S = .185''$      $p = .112''$
$\beta = 0°$      $q = .015''$
$h = .59''$      $\alpha = 32°$
$l = .155''$

FIGURE 3

$R = 2.08''$      $t = .165''$
$S = .25''$      $p = 0.089''$
$\beta = 15°$      $q = .017''$
$h = 2.66''$      $\alpha = 20°$
$l = .29''$

FIGURE 4

$R = 2.814''$      $t = .16''$
$S = .19''$      $p = q = 0.11''$
$\beta = 1°30'$      $q = .110°$
$h = 2.48''$      $\alpha = 0°$
$l = .456''$ The examples in FIGURES 1 and 2 both show inclined webs but in FIGURE 2 only the inner surface of the axially extending part decreases in radius towards the fixing end, whereas in FIGURE 1 both surfaces of the part are cylindrical or as near cylindrical as manufacturing processes will allow. There may always be some departure from true cylindrical surfaces owing to manufacturing limitations.

In FIGURE 3 both surfaces of the axially extending part decrease in radius towards the fixing end. At first the decrease is relatively rapid, but then the decrease is less rapid so that the axially extending part has a more pronounced flare adjacent the web 11. There is no attaching flange as such in this example. Instead, tapped holes 15 are provided at one end of the part.

In FIGURE 4 both surfaces of the axially extending part decrease in radius very slightly towards the fixing end, the thickness remaining constant throughout. The web 11 in this example is not inclined but it will be noted that the point O is still offset from the centre lines of the braking flange away from the fixing end of the axially extending part.

The examples given have R from 2″ to 2.814″. Discs having different radii can be made according to the invention. The values $\alpha$ and $\beta$ can each vary between 0° to 45° and the minimum value of the thickness S of the axially extending part is dictated by manufacturing (e.g. casting) technique. It may for example be as small as ⅛″. The length $h$ of the axially extending part would be greater the 0.2″. The thickness $t$ of the web would not be greater than that of the braking flange. The length $l$ of the web would be 0.1″ to 0.5″ and the offset $p$ from 0.005″ to 0.5″ and the offset $p$ from 0.005″ to 0.5″.

In general, for making discs of dimensions not within those mentioned above, the thickness $t$ of the web will be not greater than S nor greater than the thickness of the flange. The value of the offset $p$ could be from 0.005 to ¼ of R. The values for $\alpha$ and $\beta$ apply generally.

The point T may be on, or on either side of, the centre line of the braking flange and the distance $q$ of the point T from that centre line at a maximum value is the difference between the half-thickness of the braking flange and that of the web.

In every case the stiffnesses of the axially extending part and the web are such that, when the flange expands under heating, "cone" distortion and axial movement of the flange are minimised.

The dimensions $p$, $q$, $t$, $l$ and $\alpha$ are dependent on the general shape of the disc, that is on the dimensions "R, S, $h$ and $\beta$" and have been found to produce a disc in which the "cone" distortion and axial movement of the flange are minimised sufficiently to greatly reduce or eliminate the problem, referred to above, or increased pedal travel and possible failure of the brake which arises in known forms of disc.

The invention is applicable to discs in which the flange is attached at its outer periphery to the axially extending part.

What is claimed is:

1. A disc for a disc brake comprising a bell member adapted to be secured at one end to a rotatable member such as a vehicle wheel, and a flange providing braking surfaces and extending radially from the other end of said bell member, said flange being carried from the said bell member by an annular web of which the axial thickness is not greater than that of the flange, said web being inclined to a plane at right angles to the rotational axis of the disc in a direction towards the first end of said bell member and wherein the centre line of the web intersects said bell member at a point which is offset from the centre line of the flange in a direction away from the first end of said bell member, the dimension, stiffness and inclination of the web and bell member with respect to each other being such that when the disc heats up during braking cone distortion and axial movement of the flange is minmized.

2. A disc as in claim 1, in which the axial thickness of the web is less than the thickness of the braking flange.

3. A disc as in claim 1, in which the axial thickness of the web is less than the radial thickness of the bell member.

4. A disc as in claim 1, in which said offset lies between 0.005″ and 0.5″.

5. A disc as in claim 1 in which the web extends radially a distance between 0.1″ and 0.5″.

6. A disc as in claim 1 in which the bell member has an internal surface of which the radius decreases towards said first end of the bell member.

References Cited

UNITED STATES PATENTS 2,800,982  7/1957  Cottrell _____ 188—218

FOREIGN PATENTS 205,682  1/1957  Australia.
1,309,093  10/1962  France.

MILTON BUCHLER, *Primary Examiner.*

G. E. A. HALVOSA, *Assistant Examiner.*